Dec. 23, 1941.  A. R. PETERS  2,267,507
INSURANCE POLICY
Filed Aug. 6, 1940  4 Sheets-Sheet 1
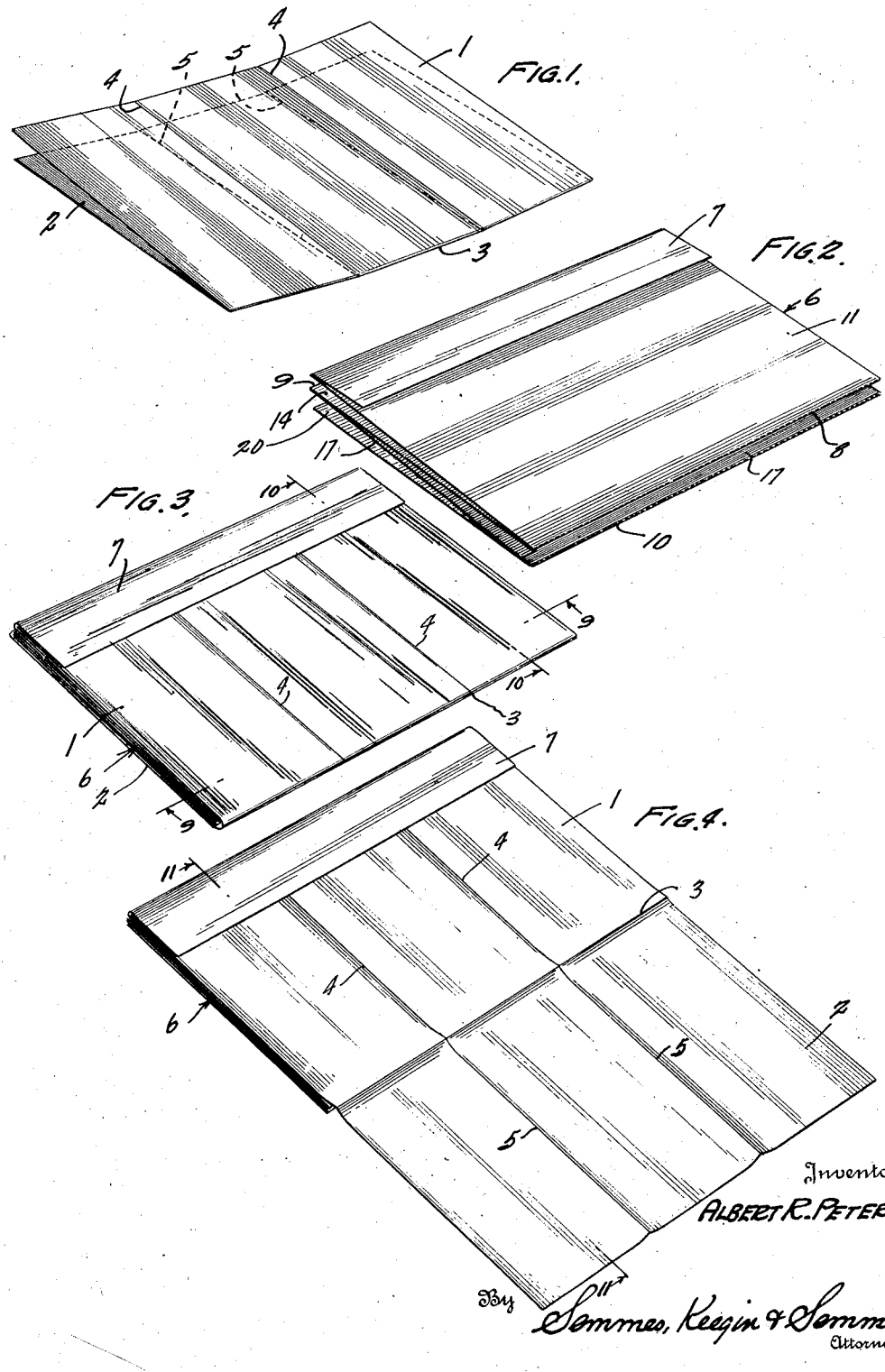
Inventor
ALBERT R. PETERS
By Sommes, Keegin & Sommes
Attorneys Dec. 23, 1941.   A. R. PETERS   2,267,507
INSURANCE POLICY
Filed Aug. 6, 1940   4 Sheets-Sheet 2
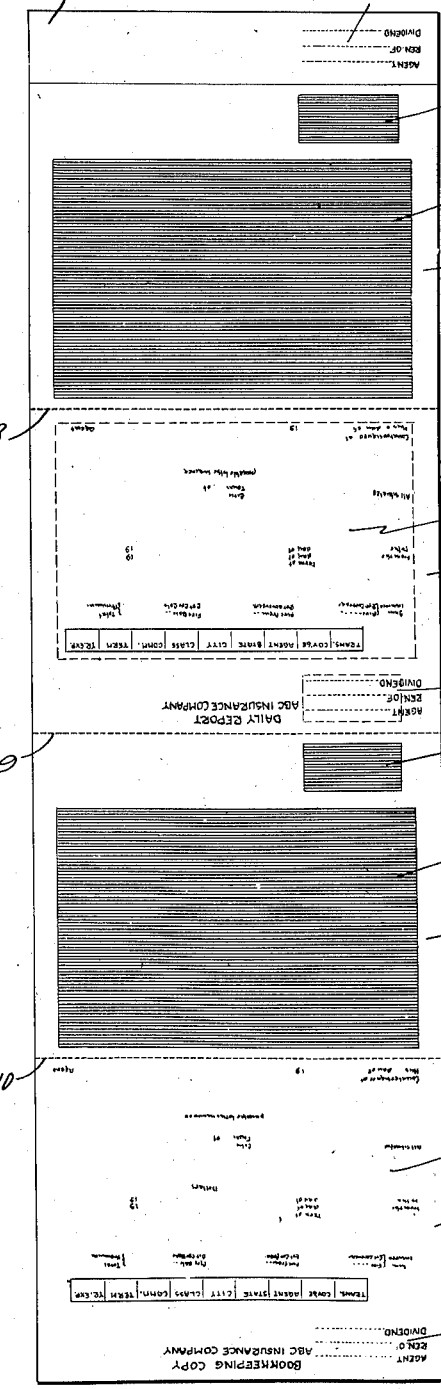
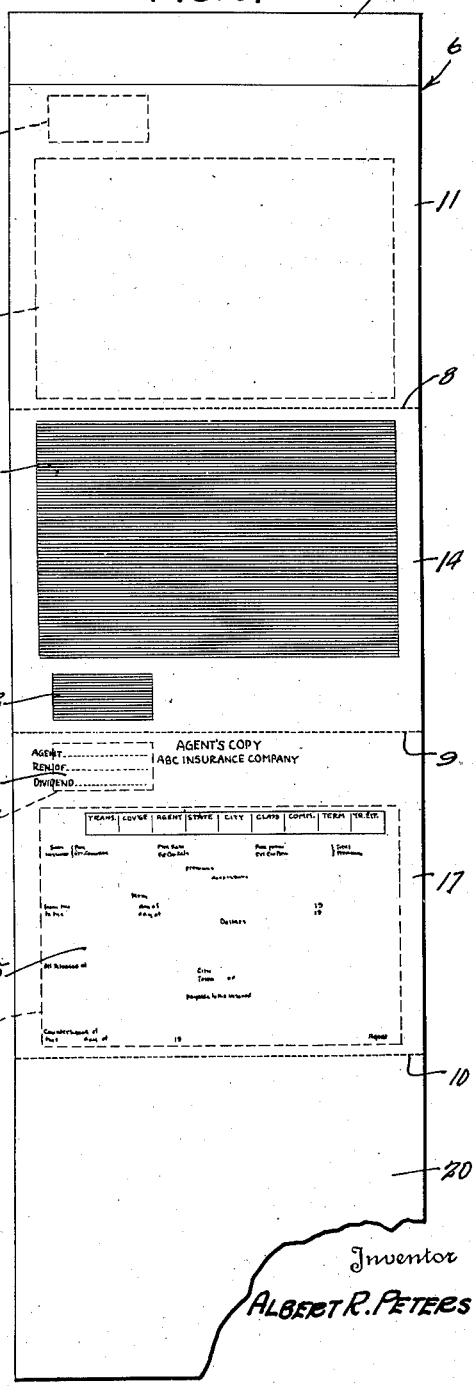
Inventor
ALBERT R. PETERS
By Semmes, Keegin & Semmes
Attorneys Dec. 23, 1941.     A. R. PETERS     2,267,507
INSURANCE POLICY
Filed Aug. 6, 1940     4 Sheets-Sheet 3
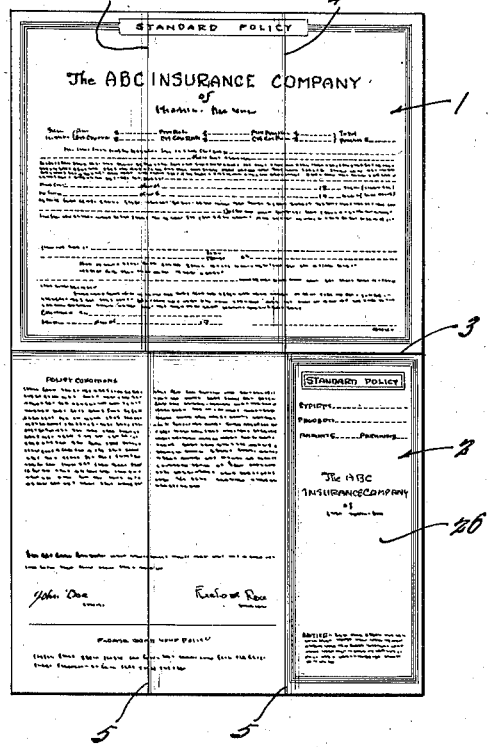
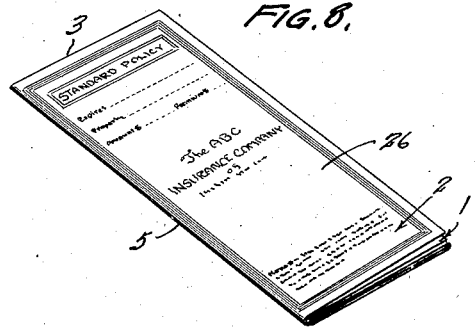
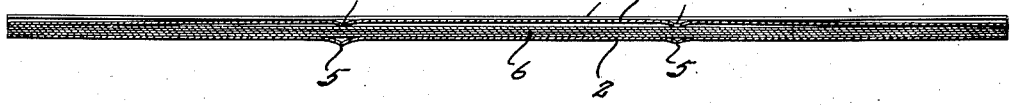
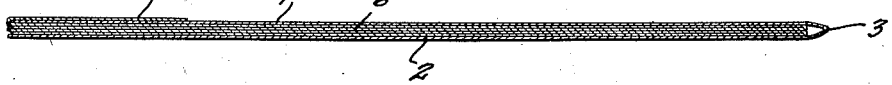
Inventor
ALBERT R. PETERS
By Semmes, Keegin & Semmes
Attorneys Dec. 23, 1941.  A. R. PETERS  2,267,507
INSURANCE POLICY
Filed Aug. 6, 1940  4 Sheets-Sheet 4
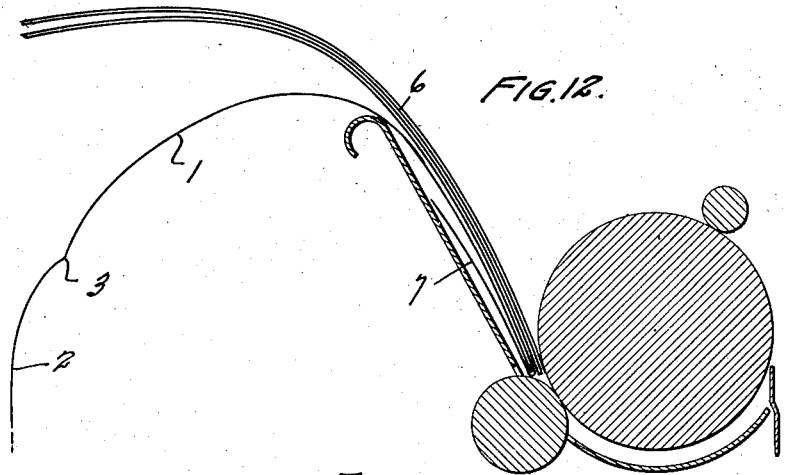
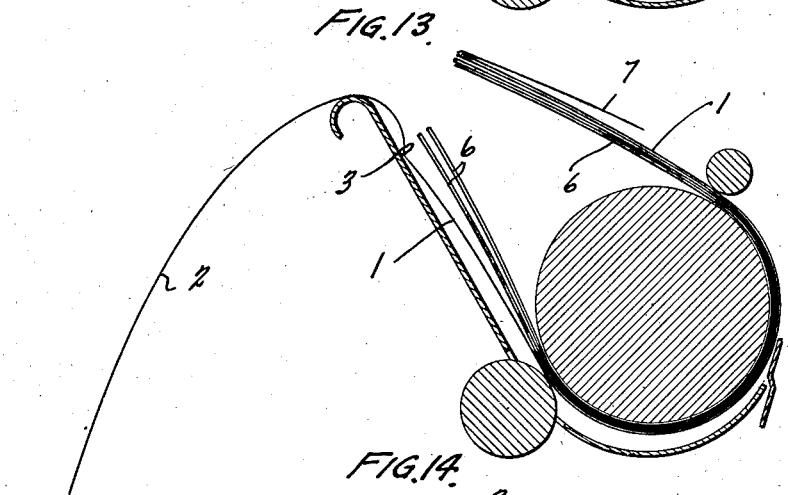
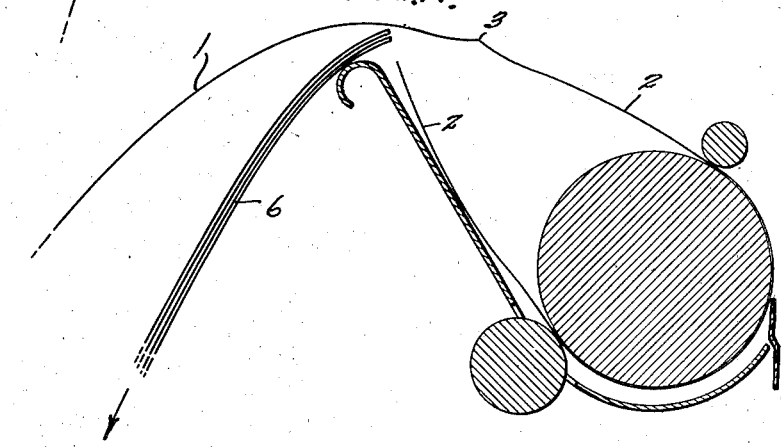
Inventor
ALBERT R. PETERS
By Semmes, Keegin & Semmes
Attorneys Patented Dec. 23, 1941

2,267,507

UNITED STATES PATENT OFFICE 2,267,507

INSURANCE POLICY

Albert R. Peters, Bradley Hills Grove, Md.

Application August 6, 1940, Serial No. 351,606

3 Claims. (Cl. 282—3)

My invention relates to insurance policies and particularly to insurance policies adapted to minimize clerical labor.

Heretofore in writing insurance, one of the difficulties has been to coordinate the work of the policy writing department in an insurance agency with the work of the bookkeeping department of that agency. Often the work of the bookkeeping department, in the case of peak policy writing loads, will be possibly three weeks behind the work of the policy writing department. This means that policies cannot be delivered to the assured and premiums collected as quickly as desired, to the dissatisfaction of the policy holders and the agencies. Moreover, the hours of work of the bookkeeping department in these periods of peak load may be greatly lengthened, while at other times the bookkeeping department is not fully employed.

The new type of policy which I have designed will enable the bookkeeping department to operate at a normal pace. The policy itself saves time in handling and labor, while smearing of the policy from handling and slipping in the typewriter is largely eliminated.

Heretofore, the insurance policy in general comprised a front sheet and a back sheet, the front sheet having a space thereon for the description of property, which was supplied by pasting onto the front sheet one of the description of property forms which was separately filled out. The description of property forms in general are three in number, one of them being an original and two being carbons. The disposition of the two carbons will be later described.

When the front sheet of the policy was filled out, a daily report was made through a carbon inserted between the front and back sheets of the policy. The carbon was superimposed over a daily report sheet upon which the amount of policy, the rate of premium and other data which was typewritten on the front sheet of the policy was transmitted through the carbon to the daily report.

One of the two carbon copies of the description of property forms, above referred to, provided one record of description of property which was pasted to the daily report. The daily report with the description of property pasted to it was sent to the home office from the insurance agency. The last of the two carbon forms with the description of property thereon was designed to go in the office records of the agency. Thus, the description of property record required a separate typing operation and two pasting operations. Moreover, the standard policy after having pasted thereon the original description of property form had to then go to the bookkeeping department and after permanent record had been made in the books of the agency, be returned to the policy writing department for mailing to the assured with the bill. This caused a waste of time, a soiling of the policy and often caused the bookkeeping department to be far behind the policy writing department of the agency.

Another feature of the old type of policy which was undesirable was that the back sheet of the policy required certain data which required the policy to be taken out of the typewriter and placed in the machine in another position. Moreover, after this work was done the policy had to be then folded.

The present policy which will now be described permits all of the papers to be prepared by a single fitting into the typewriter. There is an automatic separation of the policy and the record sheets after the necessary data has been typewritten thereon. The policy, being scored for folding, is held flat in storage because of the sufficient stiffness of the sheaf of record sheets, and further a fold-over tab on the record sheets keeps the papers aligned and aids in feeding the aligned papers into the machine. These advantages are in addition to those already enumerated.

Referring to the drawings:

Figure 1 is a perspective view of the upper and lower policy sheets in their partially folded condition.

Figure 2 is a perspective view of the record sheets in their folded condition.

Figure 3 is a perspective view of policy and record sheets assembled as stored.

Figure 4 is a perspective view of policy and record sheets assembled as inserted in the typewriter.

Figure 5 is a view of one side of the sheaf of record sheets in their unfolded condition.

Figure 6 is a view of the opposite side of the sheaf of record sheets in their unfolded condition.

Figure 7 is a view of the upper and lower policy sheets in their completely unfolded condition.

Figure 8 is a perspective view of the completely folded policy sheets.

Figure 9 is a view taken along the line 9—9 of Figure 3 looking in the direction of the arrows.

Figure 10 is a view taken along the line 10—10 of Figure 3 looking in the direction of the arrows.

Figure 11 is a view taken along the line 11—11 of Figure 4 looking in the direction of the arrows.

Figure 12 is a view partly diagrammatic showing the insertion of the assembled policy and record sheets into the typewriter roll at the beginning of the insertion operation.

Figure 13 is a view similar to Figure 12 in which the assembly of policy and record sheets is shown in position on the typewriter roll during recordation of typewritten data thereon.

Figure 14 is a view similar to Figure 12 showing the record sheets falling clear from the typewriter after the recordation on the upper policy sheet of the data which is transmitted to the record sheets.

Referring to the drawings, I have shown an upper policy sheet 1 and a lower policy sheet 2 joined together by a creased line 3 for folding. The upper policy sheet 1 and the lower policy sheet 2 are each provided with scored folds 4 and 5, respectively, permitting the sheets to be folded together after being first folded along the creased line 3 joining the sheets. The completely folded condition is illustrated in Figure 8.

Adapted to lie between the upper policy sheet 1 and the lower policy sheet 2 in storage is a sheaf of record sheets indicated generally by the numeral 6 having a fold-over tab 7 which is adapted to be folded over the upper edge of the upper policy sheet. The record sheaf 6 lies between the upper policy sheet 1 and the lower policy sheet 2 in the stored condition (see Figures 9 and 10).

The sheaf of record sheets 6, as heretofore stated, has the fold-over tab 7 and has perforated folding lines 8, 9 and 10. Adjacent to the fold-over tab 7 is a blank sheet 11 which has on one side spotted carbon, as indicated at 12 and 13. Adjacent to 11 is a record sheet 14 having spotted carbon on one side similar to that on the record sheet as indicated at 12 and 13, and on the other side is daily report data, indicated generally by the numerals 15 and 16. Adjacent the record sheet 14 is a record sheet 17 having on one face data 15 and 16 corresponding respectively to the data 16 and 15, respectively, of sheet 14. Adjacent sheet 17 is a record sheet 20 having data 15 and 16, corresponding to the data 15 and 16 of sheet 14.

One side of record sheet 17 has spotted carbon at 12 and 13 as indicated.

Sheet 20 on the side opposite the data 15 and 16 is blank.

Each of the record sheets 11, 14, 17 and 20 is adapted to receive data typed on the upper policy sheet 1, and data that is typed at 25 on the fold-over tab 7. It is understood that the tab 7 lies over the upper edge of the upper policy sheet 1. The data at 25 on the tab 7 corresponds to the data 16 of the record sheet 14; the data at 15 of the policy sheet 14 corresponds to the data on the face of the upper policy sheet 1.

This data on sheet 14 is a daily report of the agent. Similar data is transmitted to sheets 17 and 20. The sheet 17 is torn off from the sheaf of record sheets and furnishes the agent with a copy. Sheet 20 is torn off and goes to the bookkeeping department of the agency. The sheet 11 which serves solely as a carbon sheet may be reused as such or as scratch paper after the policy has been written.

The fold-over tab 7 keeps the papers aligned in their stored condition, (see Figure 3) the record sheets being of sufficient stiffness to hold the policy sheets substantially flat in spite of their scoring.

It is to be noted that all of the papers are prepared by a single fitting into the machine. When the stored sheets which are in the form illustrated in Figure 3 are to be inserted in the machine, the combined assembly is opened out into the form shown in Figure 4. The sheets are then inserted between the typewriter rolls as indicated in Figure 12. Data is typed at 25 on fold-over tab 7. The fold-over tab 7 keeps the sheets aligned and permits of ready insertion of the assembly between the typewriter rolls. Figure 13 shows the position of the parts after the assembly has been inserted in between the typewriter rolls and after the data has been typed at 25 on the fold-over tab 7. Figure 13 shows the position of the sheets between the rolls when data is being typed on the face of the upper policy sheet 1. In Figure 14 is shown the position of the assembly when the typewriter rolls are further moved to bring the lower policy sheet 2 in the position to typewrite data at 26 (see Figures 7 and 8) on the lower policy sheet 2. It is to be noted that the sheaf 6 of record sheets has fallen away from the policy sheets where they may drop into a convenient receptacle for later collection, thus saving labor in removing the record sheets from the policy sheets.

Because a permanent record is made on sheet 20 of the record sheet assembly 6 for the bookkeeping department, the policy can go directly to the policy writing department for counter-signature by the agent and be sent out immediately, not waiting for the bookkeeping department to make all the necessary entries. The bookkeeping department can thus be behind in its current work, and yet the policy writing department will not be prevented from keeping current. No carbon loose sheets are necessary, no smearing or time in handling is lost. The daily report on sheet 14 can be sent to the home insurance office. The agent can have his copy (see sheet 17 of the record sheets).

While I have shown one form of my invention, I desire that the invention be limited only by the scope of the appended claims and the showing of the prior art.

I claim:

1. In insurance policy papers for use with the typewriter, upper and lower policy sheets, said sheets each being of the same size and joined by a scored line, other scored lines in spaced apart relation and perpendicular to said first mentioned scored line, said perpendicular scored lines on each of said sheets permitting the sheets to be folded together after being first folded along the first mentioned scored line joining the sheets, said sheets being adapted to be fully opened in unfolded condition for typing data thereon, a sheaf of folded record sheets having carbon spotted on them for recording data on the adjacent sheet in the sheaf, said record sheets being proportioned to lie beneath the upper policy sheet only during recordation in the typewriter, said sheaf of record sheets being of sufficient stiffness to hold the scored policy sheets substantially flat in normal storage prior to insertion in the typewriter when the policy sheets are folded together only along the scored line forming the junction between the upper and lower policy sheets.

2. In insurance policy papers for use with the typewriter, upper and lower policy sheets, said sheets each being of the same size and joined by a scored line, other scored lines in spaced apart relation and perpendicular to said first mentioned scored line, said perpendicular scored lines on each of said sheets permitting the sheets to be folded together after being first folded along the said first mentioned scored line joining the sheets, said sheets being adapted to be fully opened in unfolded condition for typing data thereon, a sheaf of folded record sheets having carbon spotted on them for recording data on the adjacent sheet in the sheaf, said record sheets being proportioned to lie beneath the upper policy sheet only during recordation in the typewriter, said sheaf of record sheets being of sufficient stiffness to hold the policy sheets substantially flat in normal storage prior to insertion in the typewriter when the policy sheets are folded together only along the scored line forming the junction between the upper and lower policy sheets, said sheaf of record sheets having a fold-over tab formed thereon adapted to fold over the upper policy sheet to align the record sheets and the upper policy sheet and facilitate the feeding of the assembly of policy and record sheets into the typewriter.

3. In insurance policy papers for use with the typewriter, upper and lower policy sheets, said sheets being of the same size and joined by a scored line, other scored lines in spaced apart relation and perpendicular to said first mentioned scored line, said perpendicular scored lines on each of said sheets permitting the sheets to be folded together after being first folded along the scored line joining the sheets, said sheets being adapted to be fully opened in unfolded condition for typing data thereon, a sheaf of folded record sheets having carbon spotted on them for recording data on the adjacent sheet in the sheaf, said record sheets being proportioned to lie beneath the upper policy sheet only during recordation in the typewriter, said sheaf of record sheets being of sufficient stiffness to hold the policy sheets substantially flat in normal storage prior to insertion in the typewriter when the policy sheets are folded together only along the scored line forming the junction between the upper and lower policy sheets, said sheaf of record sheets having a fold-over tab formed thereon adapted to fold over the upper policy sheet to align the record sheets and the upper policy sheet and facilitate the feeding of the assembly of policy and record sheets into the typewriter, said tab bearing thereon indications for the typing of information that when typewritten is transmitted through the spotted carbon on the record sheets to other record sheets.

ALBERT R. PETERS.